United States Patent [19]
Itoh et al.

[11] Patent Number: 5,477,951
[45] Date of Patent: Dec. 26, 1995

[54] ROTATION TRANSMISSION DEVICE

[75] Inventors: Kenichiro Itoh; Makoto Yasui; Shiro Gotoh, all of Iwata, Japan

[73] Assignee: NTN Corporation, Osaka, Japan

[21] Appl. No.: 255,762

[22] Filed: Jun. 7, 1994

[30] Foreign Application Priority Data

Jun. 8, 1993 [JP] Japan .................................. 5-137634
Jun. 8, 1993 [JP] Japan .................................. 5-137674

[51] Int. Cl.$^6$ .................................................. F16D 47/04
[52] U.S. Cl. ................................. 192/45.1; 192/48.92
[58] Field of Search ........................... 192/45.1, 35, 43, 192/48.92, 48.3, 103 R

[56] References Cited

U.S. PATENT DOCUMENTS 5,269,399   12/1993   Itoh et al. .......................... 192/45.1

FOREIGN PATENT DOCUMENTS

0436270A1   7/1991   European Pat. Off. .
5-118357    5/1993   Japan ................................ 192/45.1
5-118358    5/1993   Japan ................................ 192/45.1
5-118359    5/1993   Japan ................................ 192/45.1
5-118355    5/1993   Japan ................................ 192/45.1

Primary Examiner—Rodney H. Bonck
Attorney, Agent, or Firm—Nikaido, Marmelstein, Murray & Oram

[57] ABSTRACT

A device for mechanically changing over the direction of transmission of turning force in which engaging elements are mounted between its driving member and driven member. It prevents the generation of abnormal noise resulting from the repeated engagement and disengagement of engaging elements when turning force is applied from the driven member. Sprags and sprag-supporting retainers are provided between an outer ring as driven member and an inner member as driving member. Also an elastic member is mounted between the outer ring and the inner member. When turning force is transmitted from the outer ring to the inner member, the inner member and one of the retainers begin rotating first, biased by the elastic member. The retainers thus rotate relative to each other, inclining the sprags in the same direction as the inner member to a ready-to-engage position. The sprags are thus prevented from repeatedly engaging and disengaging, so that there will be no abnormal noise.

2 Claims, 12 Drawing Sheets

ROTATION TRANSMISSION DEVICE

This invention relates to a rotation transmission device mounted on the drive train of a vehicle to selectively transmit and cut off the driving force to the wheels.

An automobile is mainly used to travel forward. It is driven backward only on very limited occasions. There is proposed in Unexamined Japanese Patent Publication 5-118358 a device having a mechanical clutch capable of changing over the transmission of driving force to the front and rear wheels of a car.

This device A is shown in FIG. 14. It comprises an outer ring 61 as a driven member, an inner member 62 as a driving member rotatably mounted in the outer ring 61, a large-diameter retainer 63 and a small-diameter retainer 64 disposed between outer ring 61 and inner member 62, and sprags 65 as engaging elements received in pockets formed in the retainers 63, 64 and adapted to engage outer ring 61 and inner member 62.

The large-diameter retainer 63 is coupled to the inner member 62 through a pin 66 in an opening of a size to allow play therebetween in the peripheral direction. The pin 66 is connected to an annular pipe 70 to which is coupled a coil spring 67 to bias the large-diameter retainer 63 to impart a rotation resistance to the retainer 63 from one direction.

To one end of the annular pipe 70 is coupled, through a one-way clutch 68, a rotation resistance imparting means 69 for producing a turning effort that is opposite in direction to the biasing force of the coil spring 67. When the rotational direction of the inner member 62 is reversed, the one-way clutch 68 will engage or disengage, thus changing over the direction of the turning effort that acts on the large-diameter retainer 63.

This rotation transmission device A is mounted on the drive train of a four-wheel drive vehicle of the type (shown in FIG. 19) in which the rear wheels are the main driven wheels by coupling the inner member 62 to a front propeller shaft B which extends from the transfer C and coupling the outer ring 61 to the front differential D.

The device A has to be mounted on the vehicle so that while the vehicle is moving forward, the coil spring 67 is compressed and the retainers 63 and 64 are moved relative to each other by the spring 67 to such a position that the sprags 65 are inclined forward until they are ready to engage (FIG. 15).

On the other hand, while the vehicle begins to move back, the one-way clutch 68 will engage, coupling the large-diameter retainer 63 to the rotation resistance imparting means 69. The rotation resistance thus transmitted from the means 69 to the large-diameter retainer 63 acts as a braking torque that retards its rotation relative to the small-diameter retainer 64.

Namely, if the inner member 62 and the small-diameter retainer 64 begin to rotate while the vehicle is moving back, the braking torque is still acting on the large-diameter retainer 63, restraining its rotation. If the braking torque is greater than the torque that tends to compress the coil spring 67 to the backward-travel position (This torque is hereinafter referred to as "backward-travel changeover torque"), the large-diameter retainer 63 and the small-diameter retainer 64 are moved relative to each other in the backward-travel direction.

Thus, if the braking torque is set greater than the backward-travel changeover torque, the coil spring 67 will be compressed further until the large-diameter retainer 63 moves to the backward-travel ready-to-engage position.

While this vehicle is moving with the transfer in its neutral position (i.e. two-wheel drive mode), the turning effort may be sometimes transmitted from the front wheel through front wheel hubs (which are locked)→drive shaft→ front differential to the outer ring 61 of the rotation transmission device A.

If the vehicle is moving forward in this state, since the sprags 65 are in the forward-travel ready-to-engage position as shown in FIG. 15, the outer ring 61 will run idle relative to the inner member 62.

In contrast, if the vehicle is moving back in this state, the outer ring 61 tends to rotate the inner member 62 through the sprags 65. But since the large-diameter retainer 63 is coupled to the one-way clutch 68, when it begins to rotate in the direction corresponding to the backward movement of the car, the rotation resistance (braking torque) produced by the rotation resistance imparting means 69 will act thereon.

Thus, if turning effort is transmitted from the outer ring to the input shaft through the sprags, all the members except the large-diameter retainer 3, i.e. the inner member, the sprags and the outer ring will rotate together until the sprags 65 interfere with the large-diameter retainer 63 as shown in FIG. 16. In the state shown in FIG. 16, the sprags come into contact with the end faces of the large-diameter retainer 63, so that they are pushed by the braking torque. The sprags thus momentarily disengage from both the inner member and the outer ring as shown in FIG. 17.

In this case, no backward driving force (resistance) is transmitted to the inner member 62. Thus, the moment the sprags 65 disengage, the coil spring 67, which is in a compressed state, will expand, moving the retainers 63 and 64 to the forward-travel ready-to-engage positions. In other words, the sprags, which have momentarily disengaged, move back to the forward-travel ready-to-engage position in the next moment. Noise is produced when this cycle is repeated many times in a very short period.

On the other hand, while the vehicle is moving forward at high speed and thus the rotary members in the rotation transmission device are rotating at high speed, centrifugal force corresponding to the revolving speed of these members will act on the sprags. Such centrifugal force acts to increase the frictional force between the inner surface of the outer ring 61 and the sprags 65 when the outer ring 61 shows a tendency to run idle. The heads of the sprags 65 are thus pulled by the outer ring in such a direction that they incline in the wrong direction.

If the rotational speed increases further, the centrifugal force and thus frictional force that act on the sprags 65 will increase to such a level as to move the large-diameter retainer 63 out of its normal phase, overcoming the torque of the coil spring 67. In this state, the outer ring 61 can no longer run idle because the sprags 65 have been brought into engagement with both the cylindrical surfaces in the wrong direction.

This problem is solvable if the torque of the coil spring 67 is set larger than the frictional force produced between the sprags 65 and the outer ring 61 due to the centrifugal force. But if it is set large, the rotation resistance of the rotation resistance imparting means 69 which acts when the vehicle is backing will have to be set extremely large, because the latter has to be always larger than the former. Extremely large rotation resistance will not only markedly lower the life of the rotation resistance imparting means but also lead to heat build-up and loss of vehicle driving power.

Now we will consider this problem with reference to FIG. 18. If the biasing force of the coil spring 67 or the spring torque T is set relatively small as shown by line (i) of FIG. 18, there will appear a region I where the frictional force M between the sprags and the outer ring is greater than the spring torque T when the vehicle is traveling forward at a relatively high speed. On the other hand, if the spring torque of the coil spring 67 is set relatively large as shown by line (ii) of FIG. 18 so that the spring torque T will be always larger than the frictional force M in the entire vehicle speed range, the rotation resistance of the rotation resistance imparting means, which comes into action when the vehicle is backing up, will have to be set extremely large because it has to be even larger than the spring torque T.

A first object of the present invention is to provide a rotation transmission device using a mechanical clutch which is free of abnormal noises.

A second object of this invention is to provide a rotation transmission device which can prevent the engaging elements from inclining in the wrong direction even when it is rotating at high speed and which permits setting of the turning effort of the turning effort imparting means at a low level.

In order to achieve the first object, according to this invention, there is provided a rotation transmission device comprising a driving member and a driven member rotatably mounted one on the other, a plurality of engaging elements disposed between the driving member and the driven member and adapted to engage the members to couple them together, a retainer means mounted between the driving member and the driven member to keep the engaging elements spaced apart a predetermined distance circumferentially from one another, the retainer means and the driving member being coupled together so as to rotate together, with a play formed therebetween to allow the whole or part of the retainer means to rotate relative to the driving member, two turning effort or turning torque imparting means for imparting different turning efforts or torques, one being larger than the other, to the retainer means from opposite directions, changeover means for changing over the direction of the turning effort applied to the retainer means when the direction of rotation of the driving member is reversed, characterized in that it further comprises an elastic member provided between the driving member and the driven member for applying a predetermined turning effort between the driving member and the driven member, the turning effort applied by the elastic member being larger than the smaller one of the two turning efforts applied by the two turning effort imparting means to the retainer means.

In order to achieve the second object, there is provided a rotation transmission device wherein one of the two turning torque imparting means that produces a smaller turning effort than the other is coupled to the driving member so as to rotate together with the driving member, the one of the two turning effort or turning torque imparting means being provided with a weight which serves to increase the turning effort applied to the retainer means with increase in the centrifugal force that acts on the weight when the weight is rotating.

According to the present invention, the elastic member is provided between the driving member and the driven member. When the vehicle begins backing up and the driven member begins to rotate in the corresponding direction, the turning effort applied by the elastic member will be applied to both the driving member and the driven member. Thus, the phase of the retainer means relative to the driving member is changed over to the backward-travel position. The engaging elements are kept in the right engageable position irrespective of the rotational direction of the driving member. There will be no repeated engagements and disengagements of the sprags and thus there will be no abnormal noise.

On the other hand, according to the second solution, the turning effort of one of the turning effort imparting means adapted to rotate together with the driving member is set at such a small value that the engaging elements can barely move from one ready-to-engage position to the other. When the rotation transmission device begins rotating, the turning torque increases with the increase in centrifugal force that acts on the weight. Thus, larger resistance acts on the retainer member. Considering the entire turning effort imparting means, the turning torque is small while the rotation transmission device is at a stop or rotating at low speed, and increases gradually in proportion to the centrifugal force as its revolving speed increases.

When backing up, a car is ordinarily driven at low speed, so that the turning effort produced by one of the turning effort generating means adapted to rotate together with the driving member is small. Thus, the turning effort of the other turning effort imparting means can be set sufficiently small provided it is larger than the first mentioned turning torque. Smaller turning torque means longer life of the device, lower heat buildup and reduced loss of vehicle driving power.

Other features and objects of the present invention will become apparent from the following description made with reference to the accompanying drawings, in which:

FIGS. 1 through 7 show the first embodiment of this invention.

In the figures, an outer ring 1 is a driven member and an inner member 2 is a driving member. The inner member 2 is rotatably mounted in the outer ring 1 through bearings 18.

Figure 5:
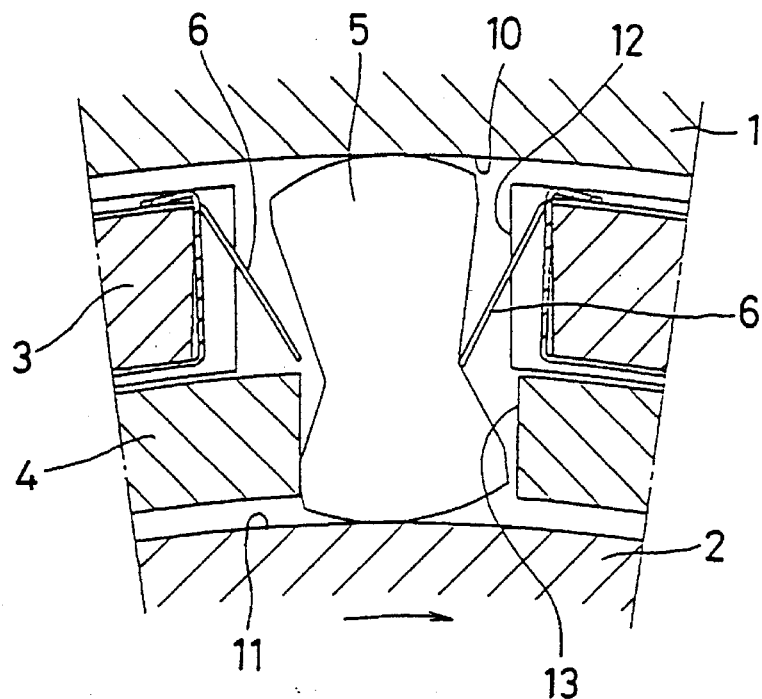
FIG. 5 is a sectional view showing one operational state of the sprags.
Figure 6:
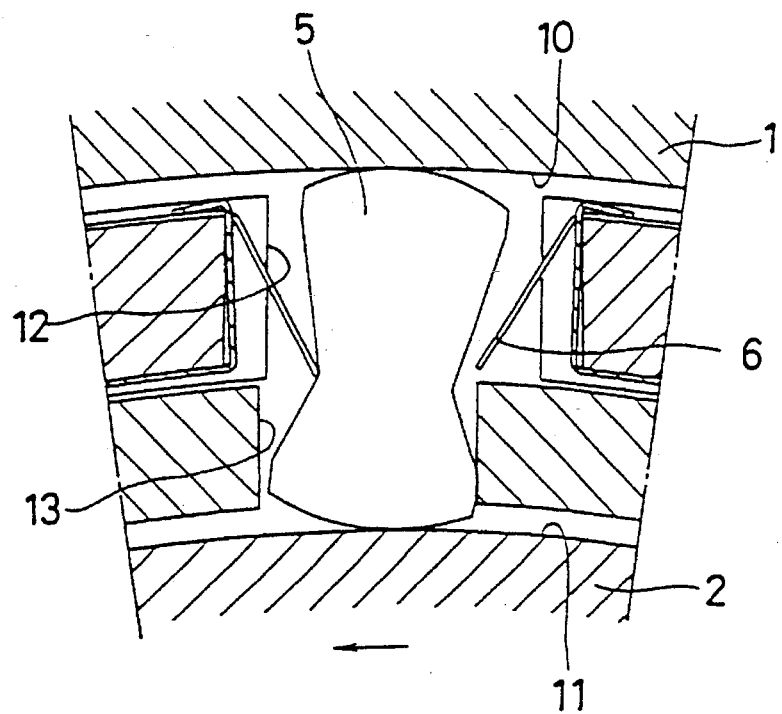
FIG. 6 is a sectional view showing another operational state of the sprags.

As shown in FIGS. 5 and 6, concentric cylindrical surfaces 10 and 11 are formed on the inner periphery of the outer ring 1 and the outer periphery of the inner member 2, respectively. Mounted between the cylindrical surfaces 10 and 11 are a large-diameter retainer 3 and a small-diameter retainer 4.

Figure 1:
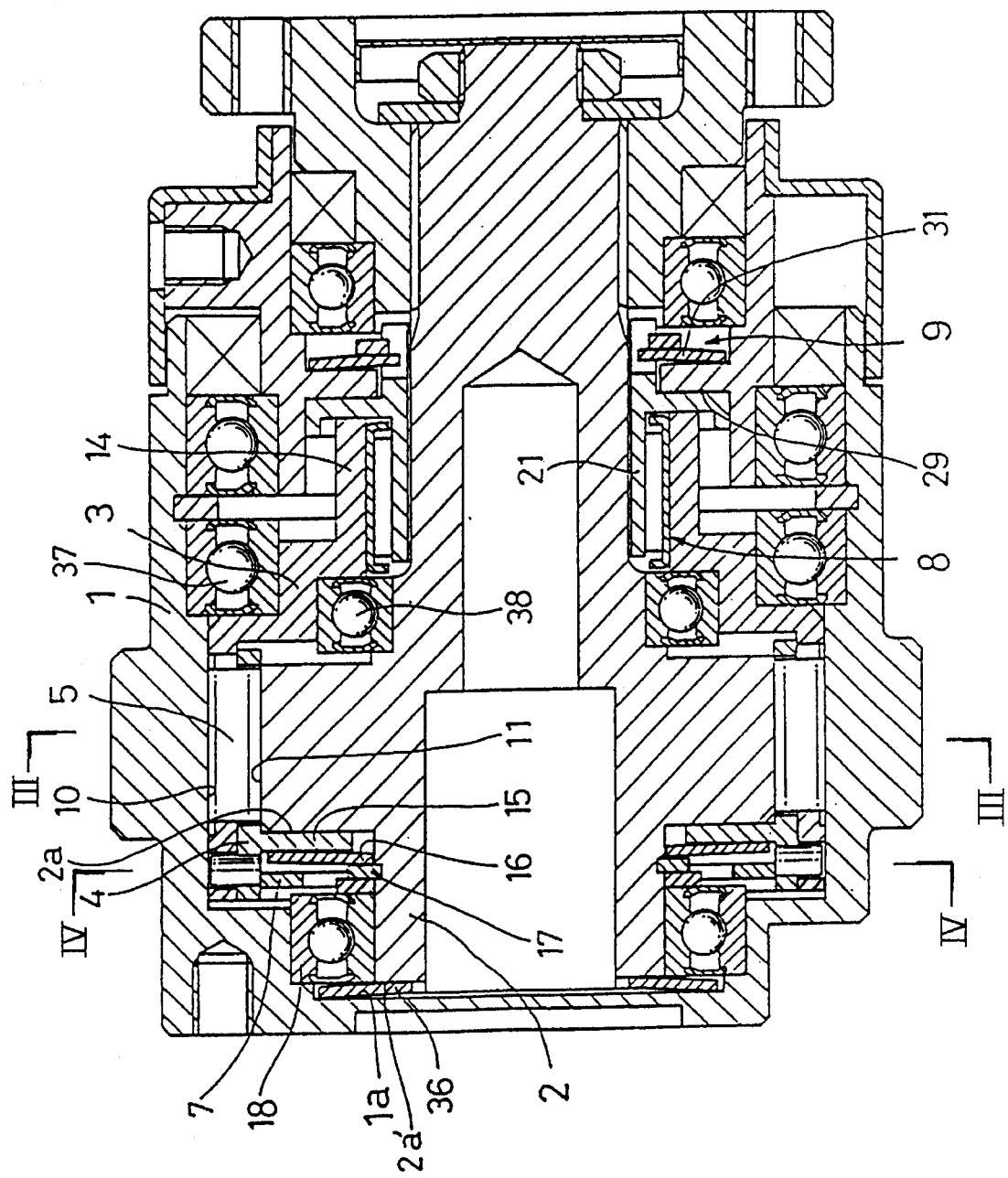
FIG. 1 is a vertical sectional front view of a first embodiment.

As shown in FIG. 1, the large-diameter retainer 3 has at its rear end an integral extension arm 14 which is rotatably supported between the outer ring 1 and the inner member 2 through bearings.

On the other hand, the small-diameter retainer 4 has at its front end a bent portion 15 bent radially inwards and held in sliding contact with an end face 2a of the inner member 2. A pressure spring 16 is mounted between the bent portion 15 and a retaining ring 17. The bent portion 15 is pressed against the end face 2a of the inner member 2 by the pressure spring 16, so that friction is produced at the contact portion therebetween. This frictional force causes the small-diameter retainer 4 to rotate together with the inner member 2.

Figure 3:
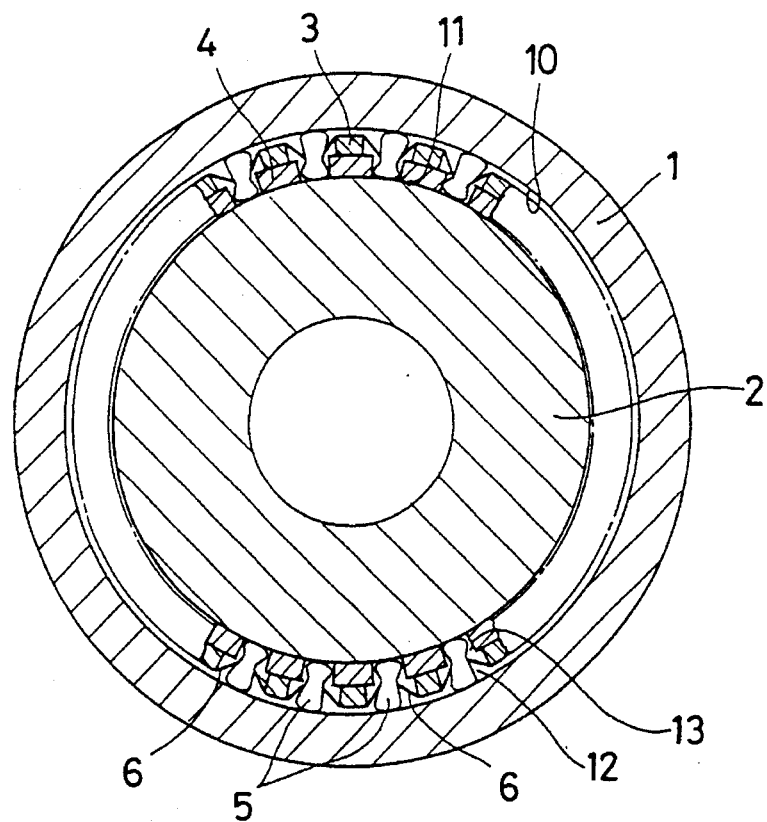
FIG. 3 is a sectional view taken along line III—III of FIG. 1.

The large-diameter retainer 3 and the small-diameter retainer 4 are formed with a plurality of radially opposite pockets 12 and 13, respectively, in which are received sprags 5 as engaging elements and springs 6 for keeping the sprags 5 in position (FIG. 3).

The sprags 5 have on their inner and outer peripheries symmetrical arcuate end faces having their centers of curvature disposed on their central axis (FIG. 5). When they are inclined to either side, the arcuate end faces will engage the cylindrical surfaces 10 and 11, thus locking the outer ring 1 and the inner member 2 together. The springs 6 have their one end supported on the large-diameter retainer 3 and bias the sprags 5 from both sides to keep them in their engaging position.

Figure 4:
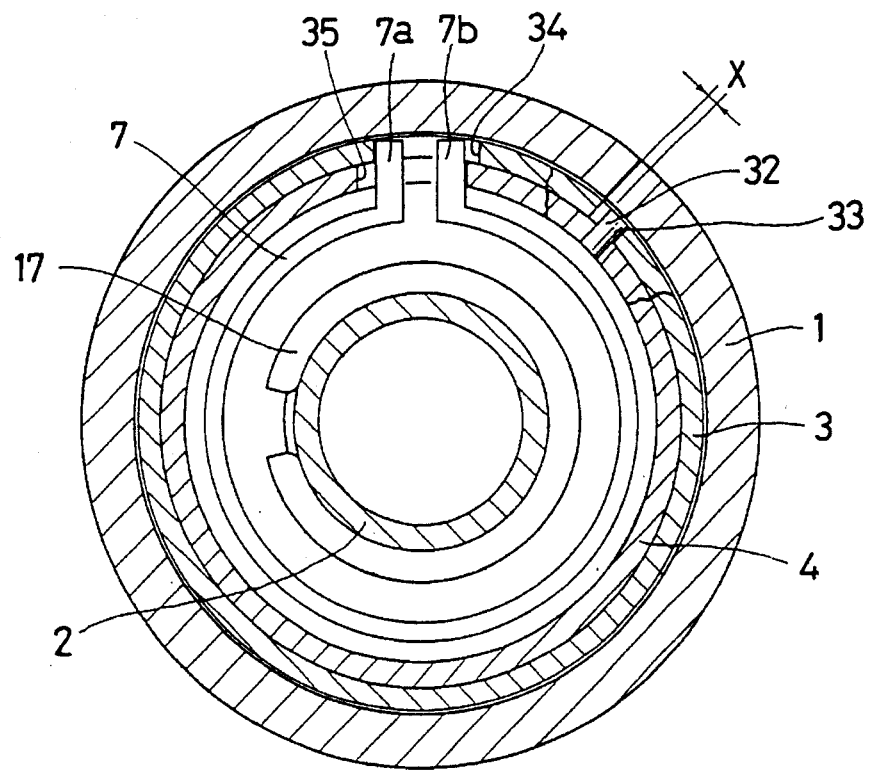
FIG. 4 is a sectional view taken along line IV—IV of FIG. 1.
Figure 8:
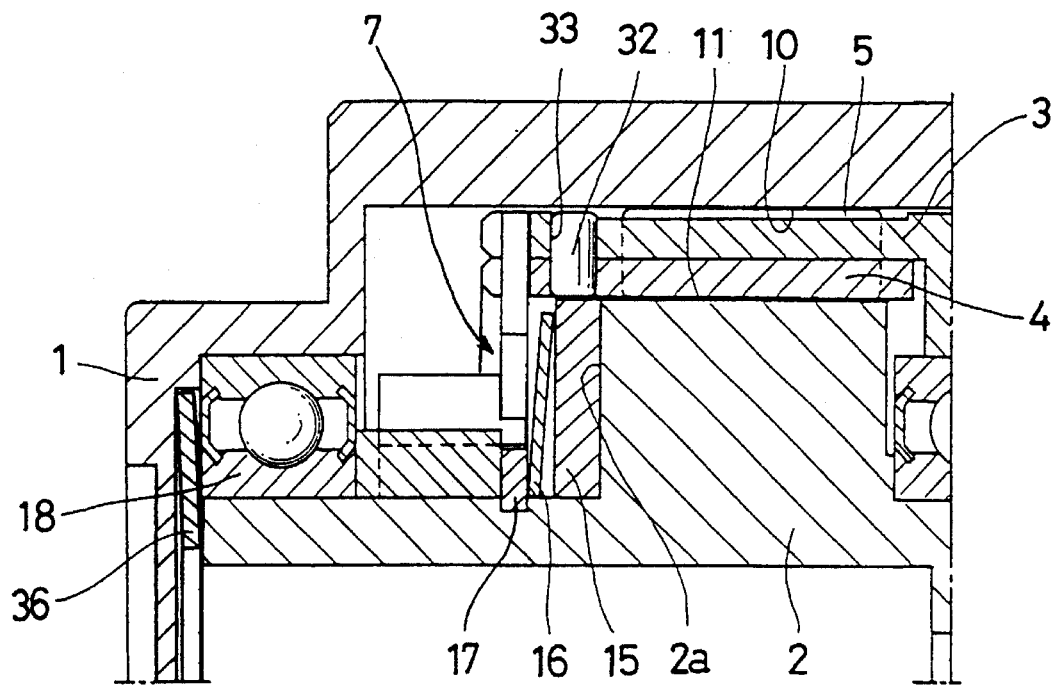
FIG. 8 is a vertical sectional front view of a second embodiment.

As shown in FIGS. 4 and 8, the small-diameter retainer 4 carries at its front end a stopper pin 32 engaged in a square hole 33 formed in the large-diameter retainer 3 with a play X left therebetween in the peripheral direction.

The large-diameter retainer 3 and the small-diameter retainer 4 are formed with slits 34 and 35, respectively, that extend diametrically through their walls. A switch spring 7 in the form of a C-shaped ring has its both ends engaged in the slits 34 and 35 (FIG. 4). It serves as a first turning effort imparting means and thus is mounted in a circumferentially compressed state as shown in FIG. 4. It has claws 7a and 7b at both ends which are pressed against the large-diameter retainer 3 and the small-diameter retainer 4, respectively. The retainers 3 and 4 are thus biased in opposite rotational directions.

The play X provided in the peripheral direction between the stopper pin 32 and the square hole 33 is large enough for the sprags 5 to be inclinable to either direction to the ready-to-engage positions shown in FIGS. 5 and 6. The switch spring 7 biases the retainers 3 and 4 to incline the sprags 5 in one of the two opposite directions to one of the two ready-to-engage positions.

Figure 7:
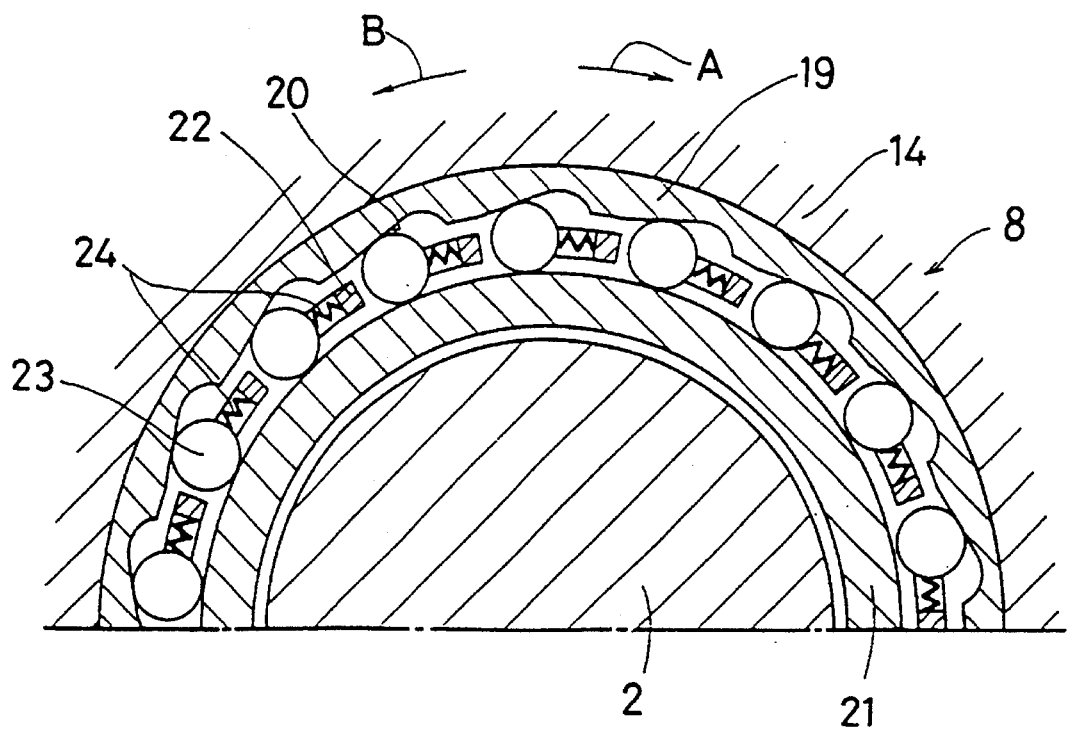
FIG. 7 is a sectional view of the one-way clutch used in the same.

A one-way clutch 8 is mounted at the rear end of the extension arm 14 of the large-diameter retainer 3 (FIG. 1). It serves to selectively connect and disconnect a second turning effort imparting means 9 to and from the large-diameter retainer 3. As shown in FIG. 7, the one-way clutch 8 has an outer ring 19 press-fitted in the rear end of the extension arm 14 and provided on the inner periphery thereof with a plurality of inclined cam surfaces 20 arranged circumferentially at predetermined intervals. An annular retainer 22 is provided between the clutch outer ring 19 and an inner ring 21. The retainer 22 has pockets in which are received rollers 23 as engaging elements and springs 24 biasing the rollers 23 against the inclined cam surfaces 20 and the surface of the inner ring 21.

When the large-diameter retainer 3 is rotated by the inner member 2 in the direction of arrow A in FIG. 7, the rollers 23 will wedge into the tapered space between the cam surfaces 20 and the inner ring 21, thus interlocking the large-diameter retainer 3 and the inner ring 21 of the turning effort imparting means 9. In contrast, when the large-diameter retainer 3 is rotated in the direction of arrow B of FIG. 7, the rollers 23 will become free and the large-diameter retainer 3 disengage from the inner ring 21.

Figure 2:
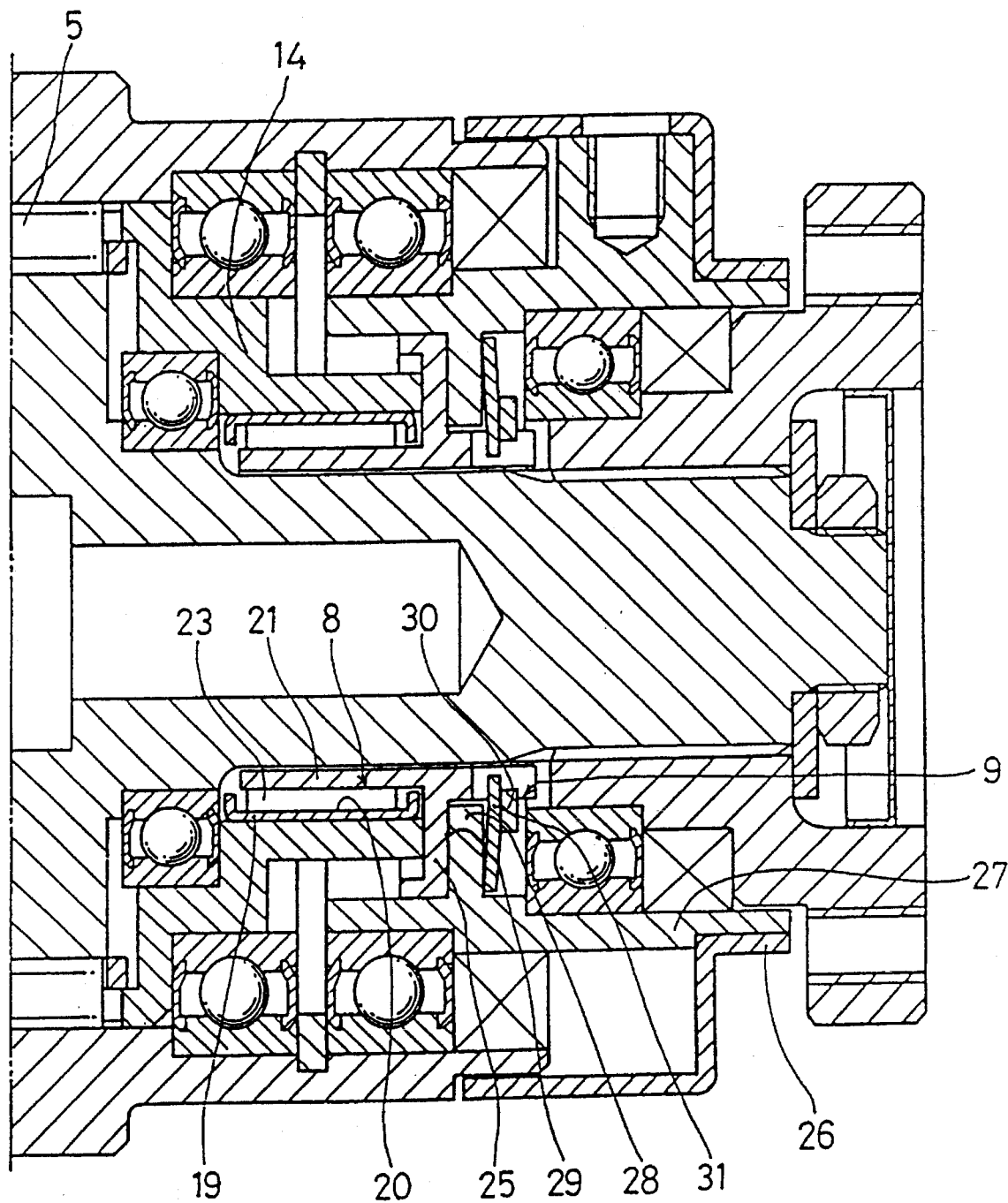
FIG. 2 is an enlarged vertical sectional front view of a portion of the same.

The turning effort imparting means 9 has, as shown in FIG. 2, the inner ring 21, which has a flange 25, and a flange 28 of a resistor case 27 fixed to the car body through a dust cover 26. The flange 28 is kept in frictional contact with the flange 25 at a frictional contact portion 29, biased by a disc spring 31 mounted between the flange 28 and a retaining ring 30.

Predetermined frictional force is produced at the frictional contact portion 29 by the biasing force of the disc spring 31. The frictional force in turn produces a dragging torque that tends to retard the rotation of the inner ring 21 with respect to the large-diameter retainer 3.

The turning effort or torque P2 produced at the frictional contact portion 29 is set to be greater than the turning effort or torque P1 applied to the large-diameter retainer 3, i.e. the force of the switch spring 7. Thus, when the large-diameter retainer 3 and the inner ring 21 begin to rotate together with the one-way clutch 8 engaged, the turning effort produced at the frictional contact portion 29 overcomes the biasing force of the switch spring 7 and reverses the phase relation of the large-diameter retainer 3 with respect to the small-diameter retainer 4.

In this embodiment, as shown in FIG. 1, an elastic member 36 which is a disc spring is mounted between an end wall 1a of the outer ring 1 as the driven member and an end wall 2a' of the inner member 2 as the driving member.

The elastic member 36 is mounted between the outer ring 1 and the inner member 2 in a compressed state so as to bias them away from each other and produces a frictional resistance so that they will rotate together.

The frictional resistance P3 produced by the elastic member 36 is set to be greater than the turning effort or torque P1, which is applied to the large-diameter retainer 3 by the switch spring 7 (P3>P1).

Figure 19:
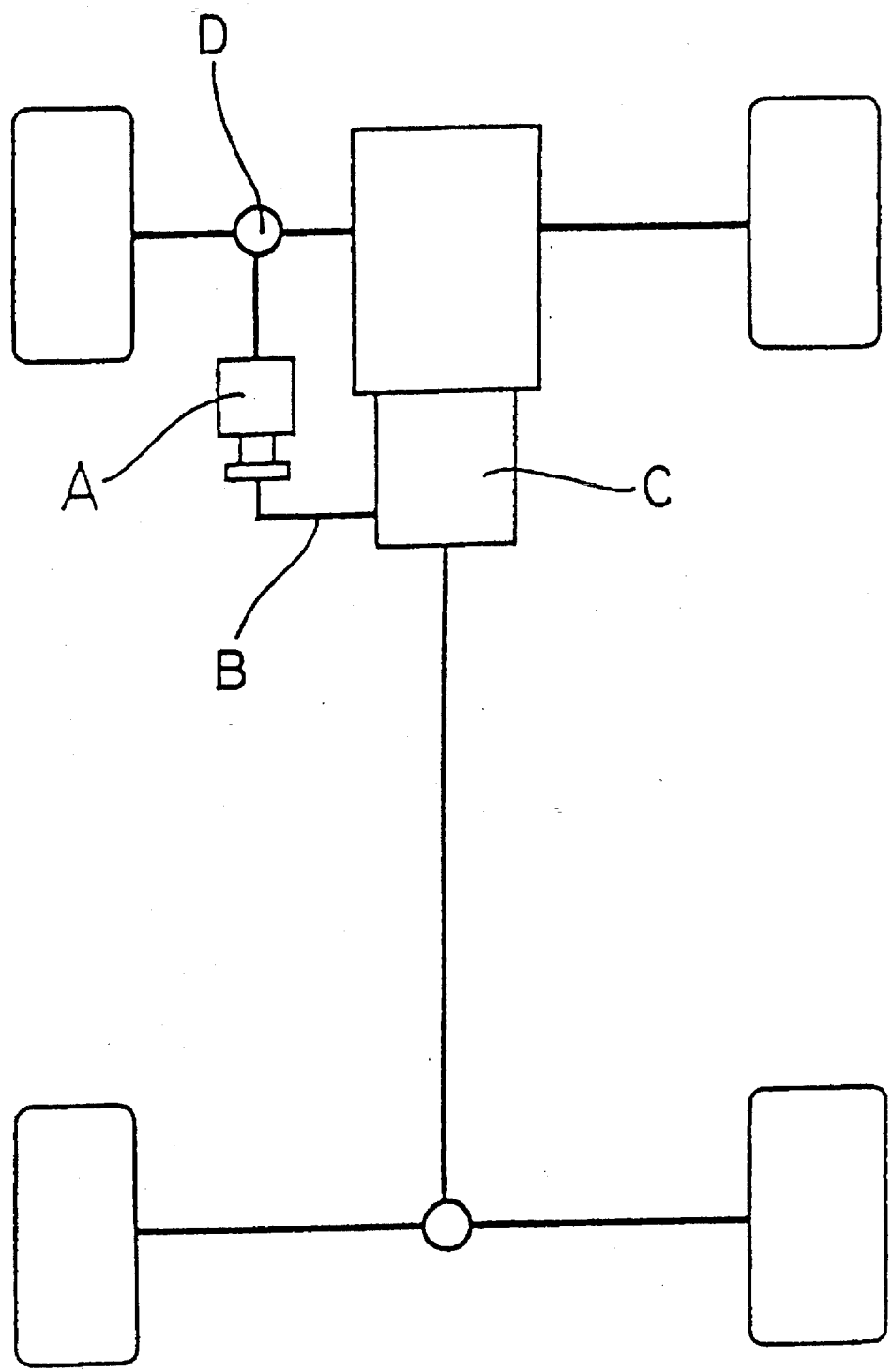
FIG. 19 is a schematic view showing how a rotation transmission device is mounted on the drive train of a vehicle.

In mounting the rotation transmission device A of this embodiment on the drive train of the vehicle shown in FIG. 19, its inner member 2 is coupled to the front propeller shaft B which branches from the transfer C, while the outer ring 1 is coupled to the front differential D. In this case, the device A is mounted so that while the vehicle is moving forward, the inner member 2 rotates in such a direction that the one-way clutch 8 is disengaged (direction of arrow B of FIG. 7) and while the vehicle is backing up, it rotates in such a direction that the one-way clutch 8 engages (direction of arrow A of FIG. 7).

When the vehicle begins to move forward in this state, the inner member 2 will begin to rotate driven by the front wheel propeller shaft B. The small-diameter retainer 4, integral with the inner member 2, rotates together with the inner member 2. The large-diameter retainer 3 also rotates together, biased by the switch spring 7. But the inner ring 21 of the turning effort imparting means 9 as well as the resistor case 27 and the spring 31 is kept stationary because in this state the one-way clutch 8 is disengaged.

In contrast, when the vehicle begins backing up in the four-wheel drive mode (namely, with turning force inputted from the inner member 2), the inner member 2 and the small-diameter retainer 4 begin to rotate together and the large-diameter retainer 3 also rotates together with the small-diameter retainer 4, biassed by the switch spring 7. The moment the large-diameter retainer 3 begins rotating in this direction, the one-way clutch 8 will lock, so that the inner ring 21 begins to rotate together with the large-diameter retainer 3.

Since the turning effort P2 produced at the frictional contact portion 29 is greater than the turning effort P1 produced by the switch spring 7, the large-diameter retainer 3 will lag with respect to the small-diameter retainer 4 due to the resistance of the turning effort imparting means 9. The sprags 5 will thus be inclined in the direction opposite to the above until they are ready to engage the cylindrical surfaces 10, 11 again. Thereafter, the large-diameter retainer 3 keeps rotating with the sprags 5 kept in the ready-to-engage position.

While the vehicle is backing up in the two-wheel drive mode (namely, with turning force inputted from the outer ring 1), the inner member 2 and the small-diameter retainer 4 are rotated together with the outer ring 1 due to the frictional resistance produced by the biasing force of the elastic member 36. Meanwhile, the torque by the turning effort imparting means 9 is being applied to the large-diameter retainer 3, thus restraining its movement. Also, the frictional resistance produced by the biasing force of the elastic member 36 is set to be greater than the force of the switch spring 7.

Thus, when a turning moment is applied from the outer ring 1 to the inner member 2 through the sprags 5, the inner member 2 and the small-diameter retainer 4 will rotate by the resistance produced by the biasing force of the member 36, thereby moving the retainers 3 and 4 relative to each other until the sprags 5 are inclined to the backward-travel ready-to-engage position. Once the sprags are inclined to this position, even if the outer ring 1 keeps rotating in the same direction, it will overrun the inner member 2, keeping the sprags in the ready-to-engage position. Namely, the sprags will never engage and disengage repeatedly and thus there will be no abnormal noise.

Also, due to the turning effort produced between the outer ring 1 and the inner member 2 by the elastic member 36, the inner member 2 is rotated together with the outer ring 1 while the vehicle is traveling forward in the two-wheel drive mode with the front wheel hubs locked. In other words, both members rotate at the same speed in this state, so that the sprags 5 are less likely to slip on the outer ring 1 and the inner member 2. This reduces wear of the sprags 5.

By the provision of the elastic member 36, axial resilient forces will act on the outer ring 1 and the inner member 2 in such a way as to exert axial preloads on the bearings 37 and 38 which support the large-diameter retainer 3. Such preloads serve to eliminate radial gaps in the bearings 37, 38. This improves balance of rotation of the bearings, which in turn leads to reduced vibration.

Figure 9:
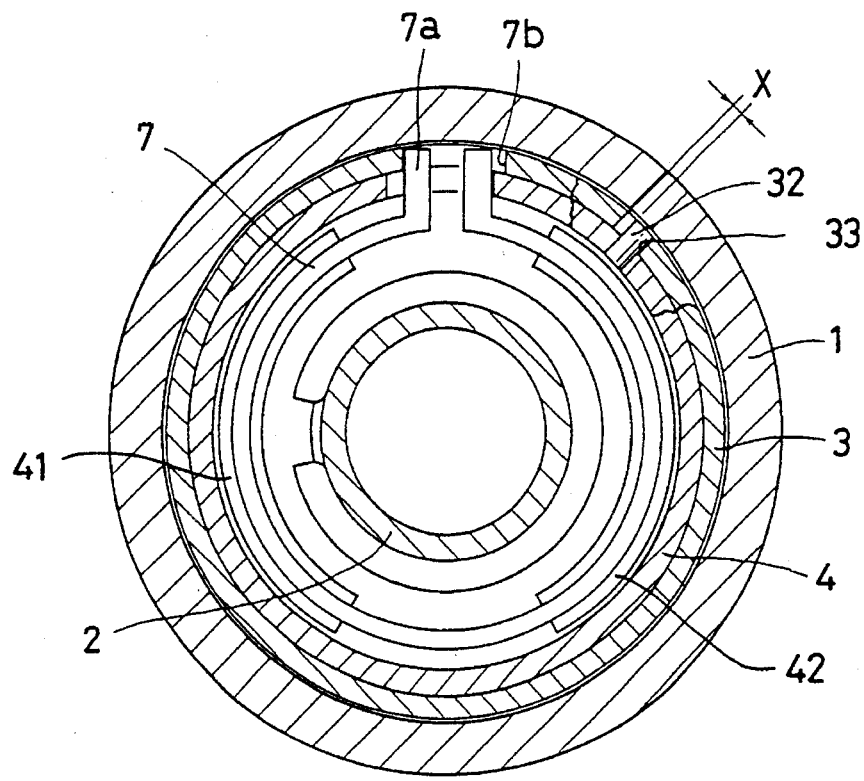
FIG. 9 is an enlarged sectional view of a portion of the same.
Figure 10:
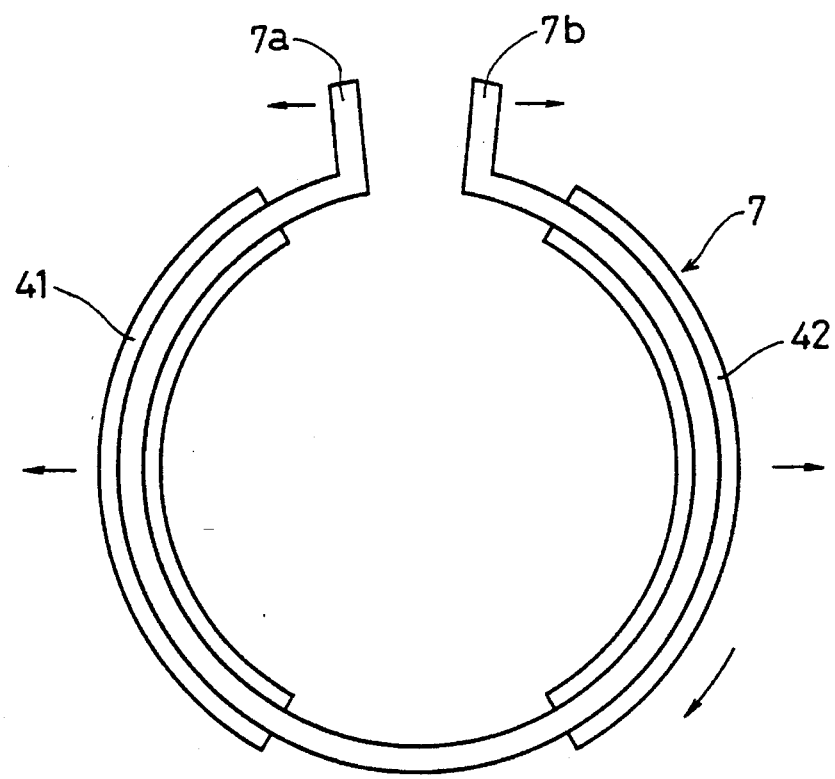
FIG. 10 is a front view of the switch spring of the same.

FIGS. 8 through 10 show the second embodiment. The second embodiment is basically the same in structure as the first embodiment. Only difference is the shape of the switch spring as the first turning effort imparting means.

As shown in FIGS. 9 and 10, the switch spring 7 of this embodiment carries on both sides a pair of diametrically opposite weights 41 and 42. Centrifugal force acts on the weights 41, 42 while the switch spring 7 is rotating together with the retainers 3, 4 (and thus the inner member 2), thus spreading the switch spring 7 and increasing its spring force.

In this state, the spring force exerted on the retainers 3 and 4 by the switch spring 7 is equal to the sum of the inherent biasing force of the switch spring and the additional force produced by the centrifugal force that acts on the weights 41, 42. Thus, the turning effort P1 acting on the large-diameter retainer 3, which is equal to the abovementioned spring force, can be maintained smaller than the turning effort P2 of the turning effort imparting means 9 and greater than the frictional force M that acts between the sprags 5 and the outer ring 1 (M<P1<P2) while the vehicle is backing up at low speed with the sprags inclined as shown in FIG. 6.

The weights 41 and 42 have to be heavy enough so that the turning effort P1 by the switch spring 7 exceeds the turning effort P2 of the turning effort imparting means 9 (P1>P2) when the rotational speed of the switch spring 7 has increased to a sufficiently high level.

Figure 11:
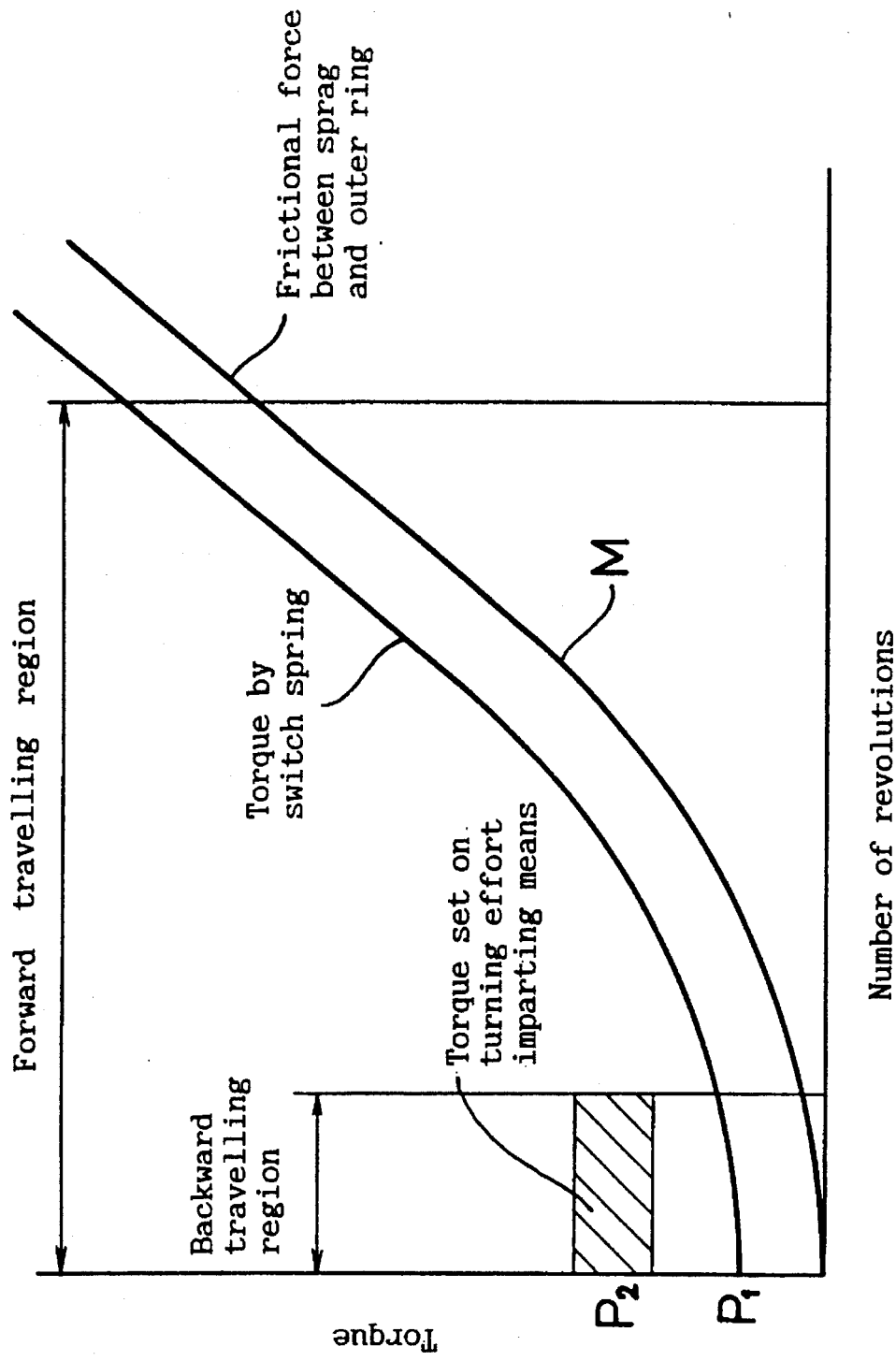
FIG. 11 is a graph showing the range of setting of the rotation resistance of the switch spring and the rotation resistance imparting means.

While the vehicle shown in FIG. 19 is moving forward with the rotation transmission device A of this embodiment mounted on its drive train, the one-way clutch 8 is kept disengaged, so that only the turning effort of the switch spring 7 acts on the large-diameter retainer 3 for changing the phase of the sprags 5. While the vehicle is backing up, the sliding resistance produced at the frictional contact portion 29 acts on the retainer 3, overcoming the biasing force of the switch spring 7. Namely, while the car is moving forward, as shown in FIG. 11, the turning effort or torque of the switch spring 7 increases gradually with the increase in the vehicle speed and the rotational speed of the inner member, due to the increasing centrifugal force that acts on the weights 41, 42. Thus, the turning effort of the switch spring 7 is kept always greater than the frictional force M between the sprags and the outer ring, which also increases with the increase in the revolving speed of the inner member. The sprags 5 are thus prevented from being inclined in the wrong direction.

The turning effort P1 of the switch spring 7, which increases under the centrifugal force, remains at a low level while the vehicle is at a stop or backing up at low speed. Thus, the turning effort P2 produced at the frictional contact portion 29, which has to be set greater than the turning effort P1, can be set at a low value. This makes it possible to reduce the spring force of the disc spring 31 and thus to reduce the heat build-up and wear at the frictional contact portion.

In the above embodiment, the weights 41 and 42 are provided integral with the switch spring 7. But they may be separate bodies provided the switch spring is spread apart by the centrifugal force that acts on the weights.

Figure 12:
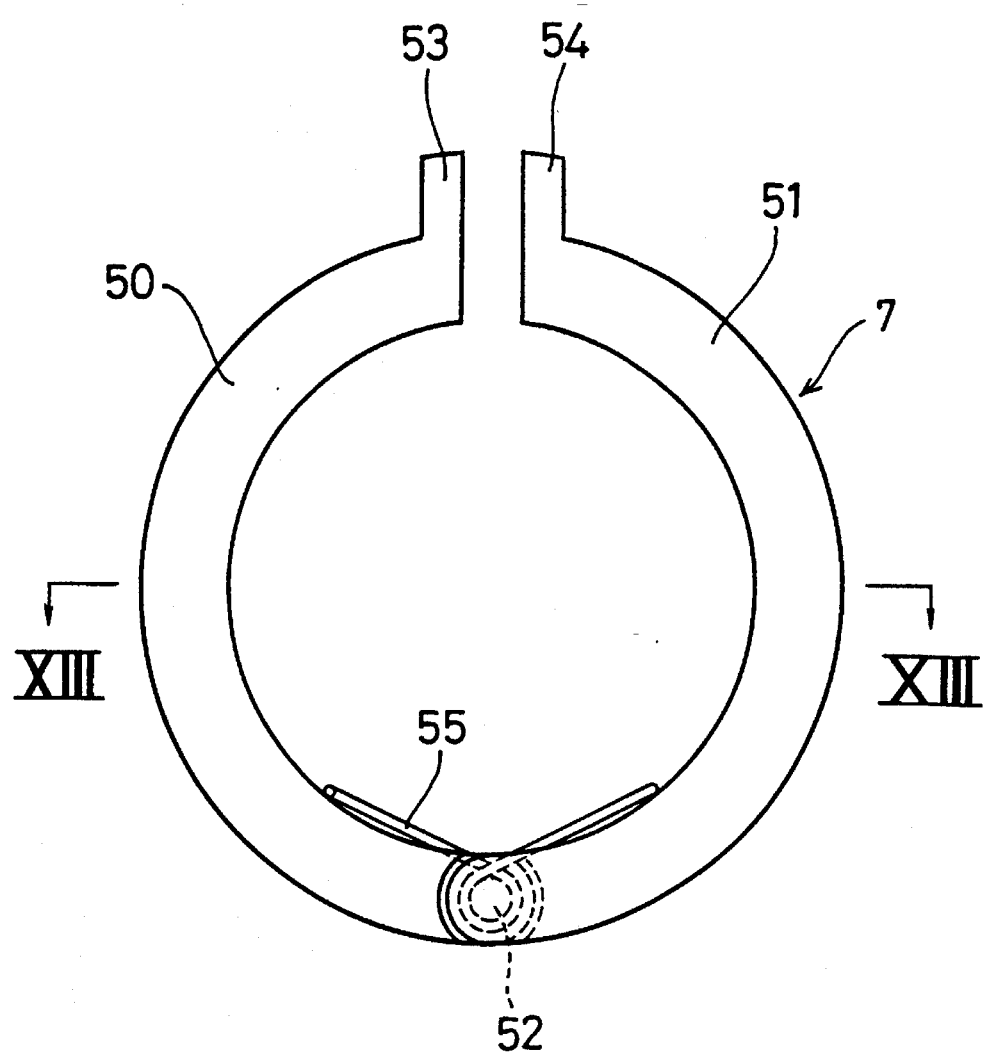
FIG. 12 is a front view showing another embodiment of the switch spring.
Figure 13:
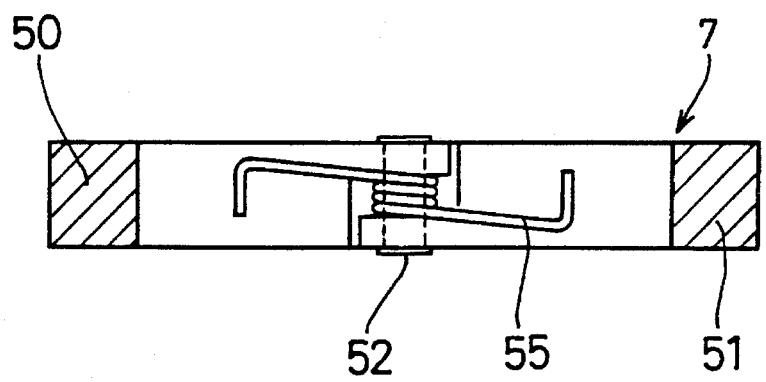
FIG. 13 is a sectional view taken along line XIII—XIII of FIG. 12.
Figure 14:
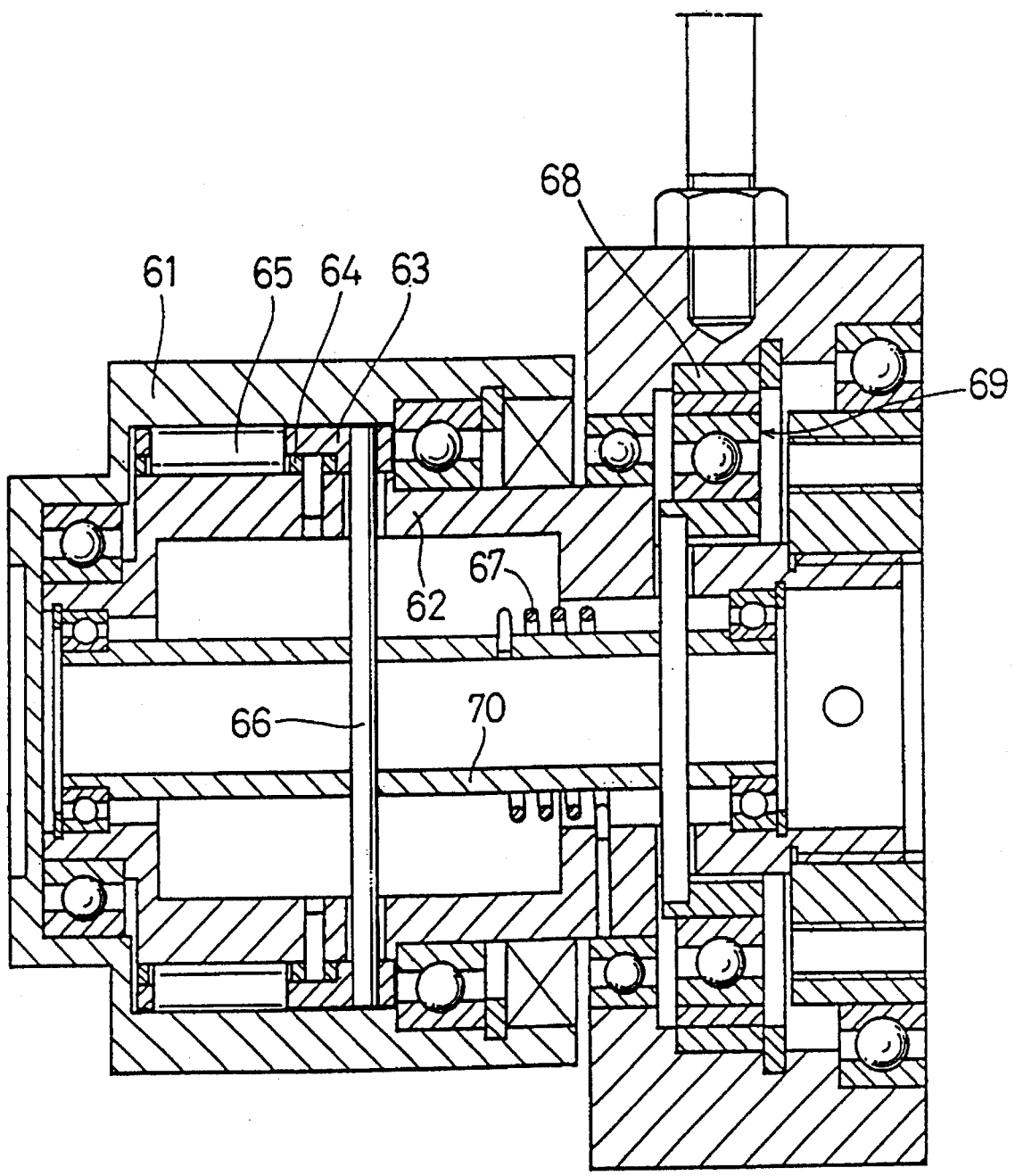
FIG. 14 is a vertical sectional front view of the prior art device.
Figure 15:
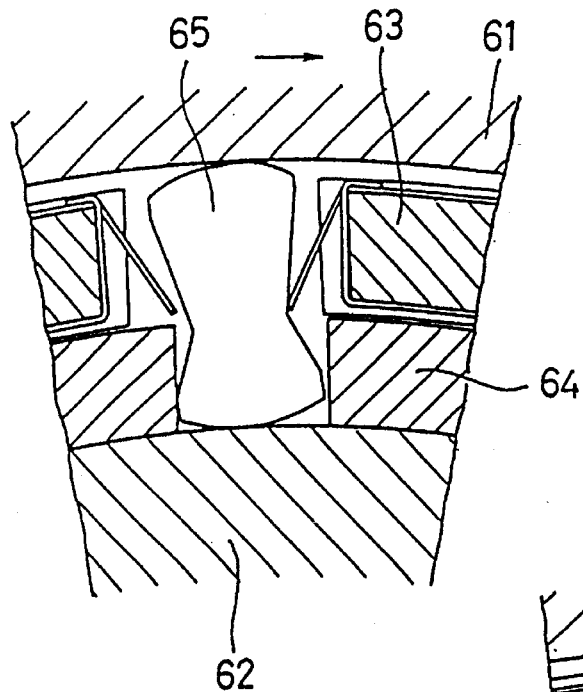
FIGS. 15–17 are sectional views of the sprags in different operational positions.
Figure 16:
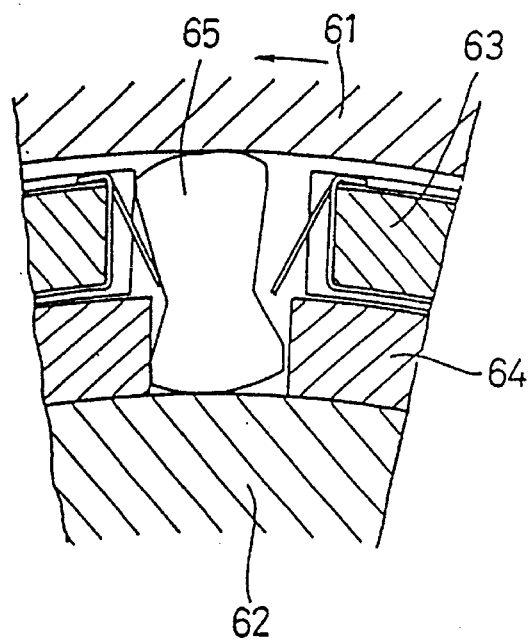
Figure 17:
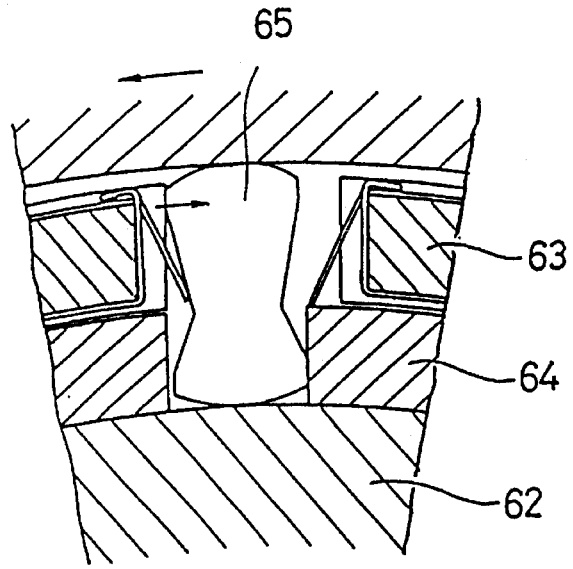
Figure 18:
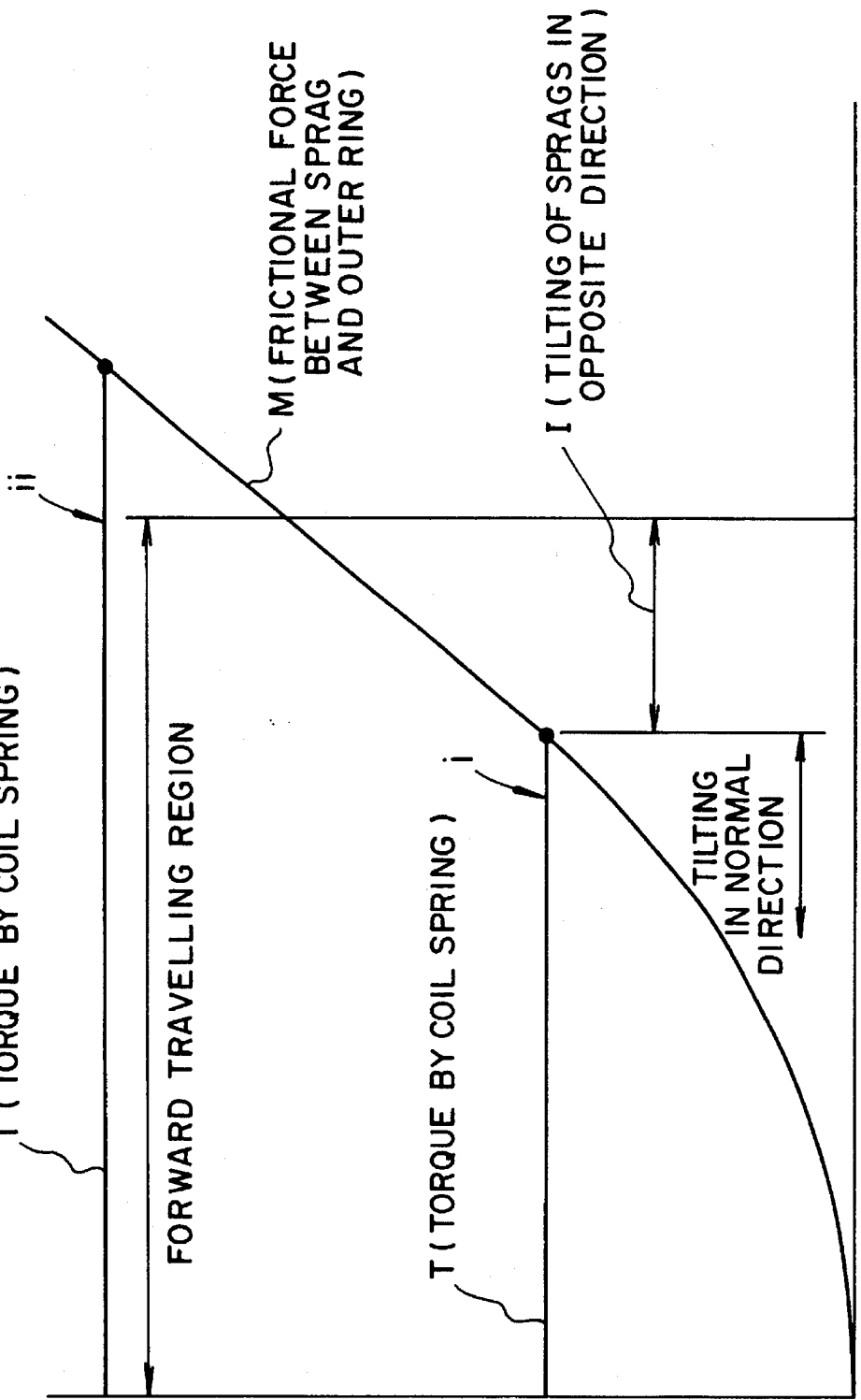
FIG. 18 is a graph showing the range of setting of the rotation resistance by the coil spring.

FIGS. 12 and 13 show another embodiment of the switch spring, in which the switch spring comprises two semicircular weights 50, 51. One end of one weight is pivotally coupled to one end of the other weight by means of a pin 52. Claws 53 and 54 are provided at the other ends of the respective weights 50, 51. A coil spring 55 is mounted on the pin 52 with its both ends kept in engagement with the respective weights 50, 51 to bias them in such a direction that they are spread open. In this arrangement, the biasing force of the switch spring 7 increases with the increase in the revolving speed of the switch spring 7 and thus the centrifugal force that acts on the weights 50, 51 increases, because the biasing force of the switch spring is equal to the sum of its resiliency and the centrifugal force.

In any of the above embodiments, the engaging elements are not limited to above-disclosed type, i.e. the type which can engage when inclined in either direction but may be of the type which can engage only when inclined in one direction. In this case, the adjacent sprags have to be arranged symmetrically, i.e. oriented opposite to each other.

Also, the engaging elements may be rollers instead of sprags. In this case, engaging surfaces have to be provided on the opposite surfaces of the outer ring and inner member.

What is claimed is:

1. A rotation transmission device comprising:

a driving member and a driven member rotatably mounted one on the other, a plurality of engaging elements disposed between said driving member and said driven member and adapted to engage said members to couple them together, a retainer means mounted between said driving member and said driven member to keep said engaging elements spaced apart a predetermined distance circumferentially from one another, said retainer means and said driving member being coupled together so as to rotate together, with a play formed therebetween to allow the whole or part of said retainer means to rotate relative to said driving member, two turning torque imparting means for imparting different turning efforts, one being larger than the other, to said retainer means from opposite direction, and changeover means for changing over the direction of the turning effort applied to said retainer means when the direction of rotation of said driving member is reversed, said change over means comprising an elastic member provided between said driving member and said driven member for applying a predetermined turning effort between said driving member and said driven member, said predetermined turning effort applied by said elastic member being larger than the smaller one of said two turning efforts applied by said two turning effort imparting means to said retainer means.

2. A rotation transmission device as claimed in claim 1 wherein one of said two turning torque imparting means that produces a smaller turning effort than the other is coupled to said driving member so as to rotate together with said driving member, said one of said two turning effort imparting means being provided with a weight which serves to increase the turning effort applied to said retainer means with increase in the centrifugal force that acts on said weight when said weight is rotating.

* * * * *